US005403110A

United States Patent [19]

Sammann

[11] Patent Number: 5,403,110

[45] Date of Patent: Apr. 4, 1995

[54] SQUARE T CLAMP ASSEMBLY FOR ELONGATE MEMBERS

[76] Inventor: Charles C. Sammann, Backyard Ventures, Inc., Box 845, Canyon, Tex. 79015

[21] Appl. No.: 12,570

[22] Filed: Feb. 3, 1993

[51] Int. Cl.[6] .................... F16B 7/00

[52] U.S. Cl. .................... 403/234; 403/205; 403/403; 52/712

[58] Field of Search .................... 403/205, 403, 234; 52/712, 714

[56] References Cited

U.S. PATENT DOCUMENTS

| | | | |
|---|---|---|---|
| 1,510,503 | 10/1924 | Schmidt . | |
| 2,651,767 | 9/1953 | Bergan . | |
| 3,860,351 | 1/1975 | Weiss et al. | 403/218 |
| 4,007,993 | 2/1977 | Schwartz | 403/403 |
| 4,421,434 | 12/1983 | Manger | 403/175 |
| 4,864,795 | 9/1989 | Burg | 523/646 |
| 5,094,562 | 3/1992 | Anderson | 403/170 |
| 5,150,982 | 9/1992 | Gilb | 403/403 X |

*Primary Examiner*—Dennis L. Taylor
*Assistant Examiner*—Christopher J. Novosad
*Attorney, Agent, or Firm*—Marcus L. Bates

[57] ABSTRACT

A clamp assembly for joining perpendicularly arranged, square, elongate, structural members to form a framework. The clamp assembly comprises a pair of shaped gripping members aligned in confronting relationship respective one another and have opposed parts that form opposed sockets which are arranged perpendicular to one another. One of the sockets receive an end of one structural member therewithin, the other of the sockets receive a medial length of another structural member therewithin to secure the perpendicularly arranged structural members together. Each gripping member is of unitary construction and has a planer surface that is divided into a first socket forming member and a second socket forming member by a through bolt extending perpendicularly therethrough. Each gripping member has opposed sides and a top opposed to a bottom, a marginal length of one side extends perpendicular to the planer surface to form adjacent wall surfaces of the first socket forming member and abuttingly receives adjacent sides of one structural member therewithin. Square, elongate structural members are arranged perpendicular respective to one another and joined together by the clamp assembly.

3 Claims, 2 Drawing Sheets

SQUARE T CLAMP ASSEMBLY FOR ELONGATE MEMBERS

BACKGROUND OF THE INVENTION

The prior art sets forth a number of clamp assemblies for use in joining together elongate members such as, for example, standard pipe sections as well as commercially available lengths of wood beams. Further, the prior art discloses other clamp members for use in constructing frameworks from sections of both round and square metal tubes.

The clamp assemblies of the prior art sometime require drilling through the clamp assemblies and through the underlying elongate member for accommodating a through bolt by which the framework is bolted together. Some of the prior art clamp assemblies are used in fabricating a temporary framework for workmen which readily can be erected and then quickly disassembled when the job has been completed. Consequently, little attention is given to the protruding parts of the clamp assembly that can cause injuries, especially to children playing on the framework.

The present invention overcomes many of the above drawbacks and provides a clamp assembly that safely secures elongate members together without the necessity of drilling bolt holes and the like through the elongate member; which has no protruding parts to injure children playing thereon; which is simple and inexpensive to fabricate, which can be reused for erecting various subsequent structures; and, which utilizes two identical bolted together parts connected in a manner that avoids the necessity of drilling bolt holes through the elongate members.

SUMMARY OF THE INVENTION

The clamp assembly of this invention joins perpendicularly arranged, square in cross-section, elongate, structural members together to form a framework. The clamp assembly comprises a pair of shaped gripping members aligned in confronting relationship respective to one another and having opposed marginal ends that form opposed sockets, with the sockets being arranged normal to one another. One socket is of a configuration to receive a marginal end of one structural member therewithin. The other socket is of a configuration to receive a medial length of another structural member therewithin. This novel clamp assembly secures the perpendicularly arranged structural members together in attached relationship and in a releasable manner.

Each gripping member is of unitary construction and has a planar surface that is divided into the first and second socket forming members by apertures that receive through bolts therethrough, so that the through bolts extend perpendicularly through the pair of gripping members and between the elongate structural members. The through bolt is tensioned to force the pair of gripping members together. The gripping members bear against and are fastened by friction to the pair of perpendicularly arranged square in cross-section, elongate, structural members.

A primary object of the present invention is the provision of two deformed sheets of metal having marginal lengths thereof formed into perpendicularly arranged sockets which extend about and attach one elongate member to another.

Another object of the invention is to provide a clamp assembly comprising a pair of shaped gripping members aligned in confronting relationship respective to one another and having opposed marginal ends that form opposed sockets, with the sockets being arranged normal to one another, and of a configuration to receive a marginal end of one structural member therewithin; and, wherein the other socket is of a configuration to receive a medial length of another structural member therewithin, to thereby secure the perpendicularly arranged structural members together in attached relationship and in a releasable manner.

A further object of this invention is to disclose and provide gripping members of unitary construction that are divided into a first socket forming member and a second socket forming member by a through bolt extending perpendicularly therethrough. Each of the gripping members is of identical construction and has opposed sides, a top opposed to a bottom, with a marginal length of one side extending perpendicular to a planar surface thereof to form adjacent wall surfaces of the first socket forming member which abuttingly receives adjacent sides of one structural member therewithin.

A still further object of this invention is to provide a clamp assembly for use in joining together elongate members, said clamp assembly is comprised of a pair of coacting gripping members, each having a planar surface that is divided into a first socket forming member and a second socket forming member by a through bolt extending perpendicularly therethrough. The sockets receive the elongate members therein.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

DETAILED DESCRIPTION OF THE PREFERRED EMBODIMENT

Figure 1:
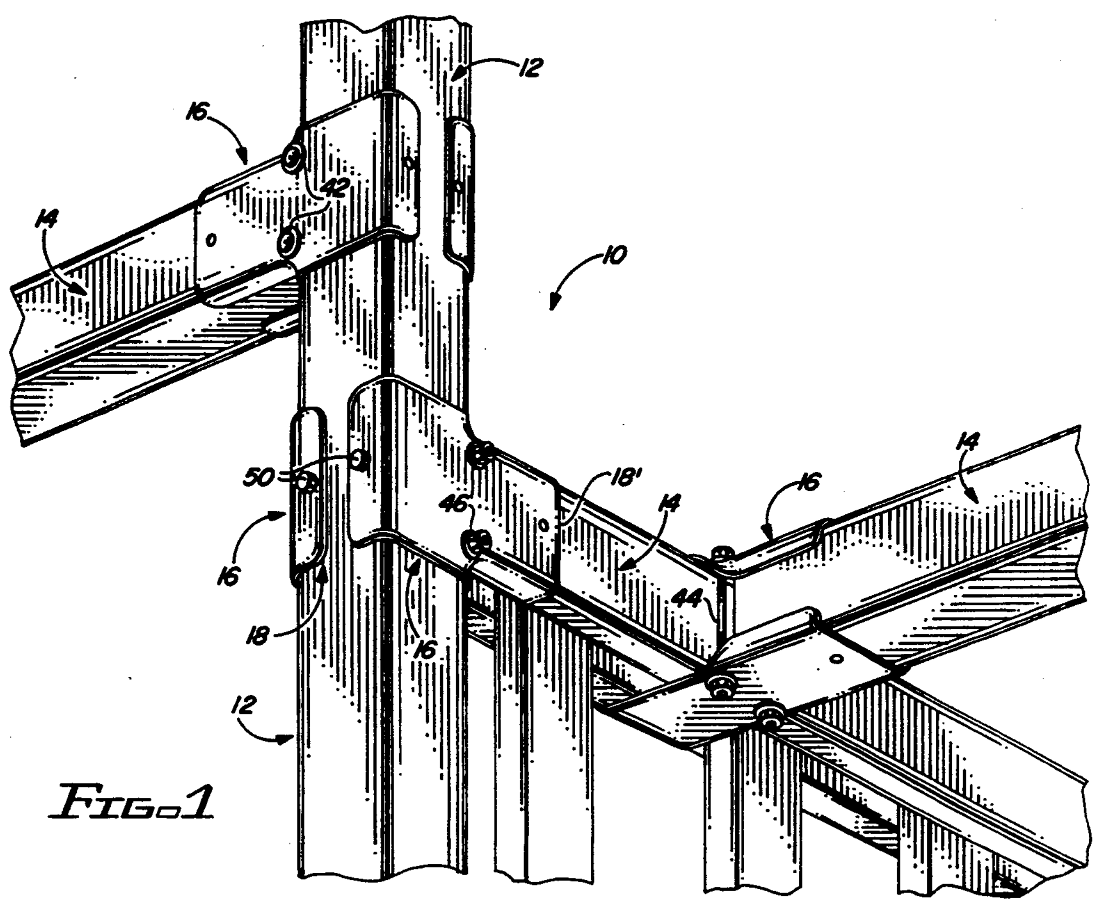
FIG. 1 is a fragmentary perspective view of a framework constructed with a plurality of clamp assemblies made in accordance with this invention.

The figures of the drawings, and in particular FIG. 1, disclose a framework 10 comprised of a plurality of vertical, square in cross-section elongate members 12 and a plurality of horizontal, square in cross-section elongate members 14. A clamp assembly 16, made in accordance with this invention, releasably secures the vertical and horizontal square in cross-section elongate members 12 and 14 together in a new and heretofore unknown manner.

Figure 2:
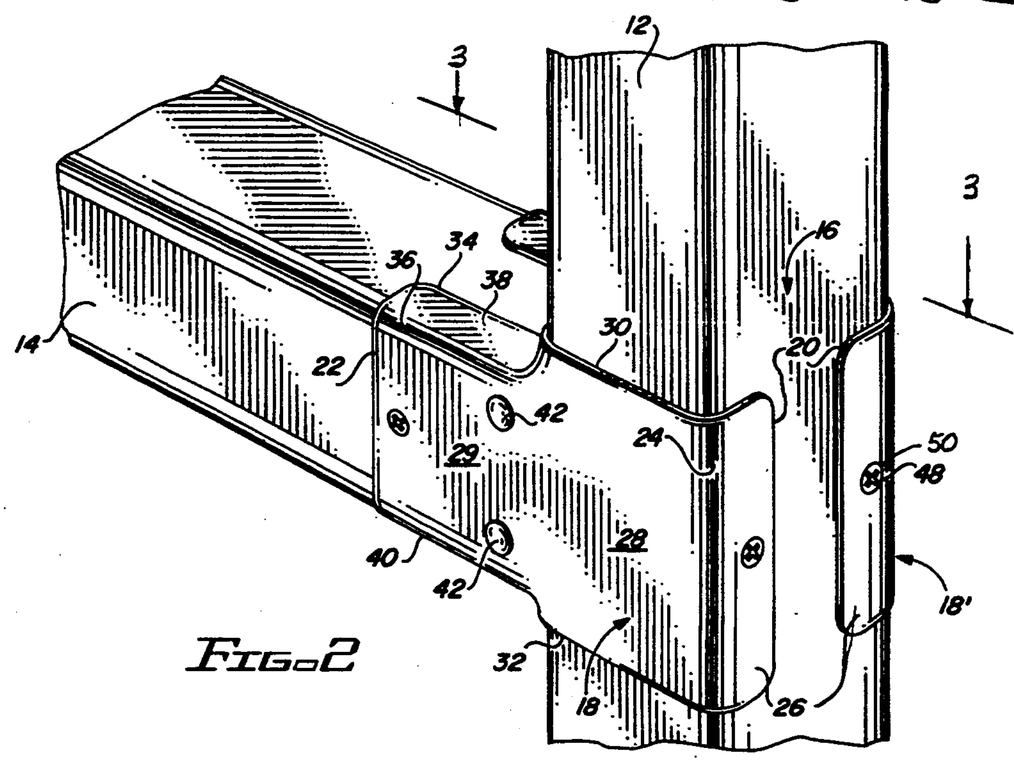
FIG. 2 is an enlarged, fragmentary, perspective view of part of the structure of FIG. 1 and showing one embodiment of the invention operatively connected to the illustrated framework.

In FIGS. 1 and 2, together with other Figures of the drawing, the clamp assembly 16 of this invention comprises a pair of shaped gripping members 18, 18'. The gripping members 18, 18' are identical in construction and each has a terminal end 20 opposed to a terminal end 22. A right angle bend 24 disposes a bent marginal length or flange 26 at right angle respective to a planar surface 28, 29. The bent marginal length 26 of each gripping member forms opposed, parallel, spaced, load bearing flanges; and, the bent marginal length 26 and the planar surface 28 forms part of a first socket. The planar surface 29 is a continuation of the planar surface 26, and forms part of a second socket.

Figure 3:
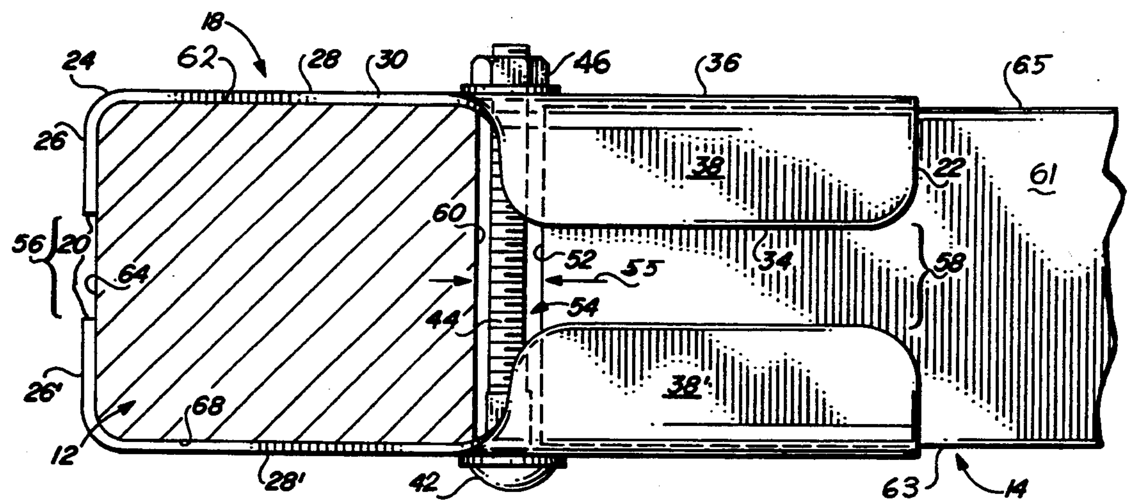
FIG. 3 is a cross-sectional view taken along line 3—3 of FIG. 2 and disclosing further details of the invention.
Figure 5:
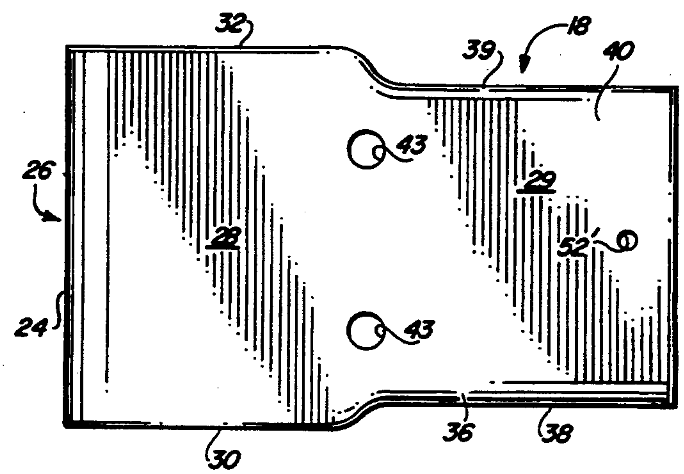
FIG. 5 is a top plan view of part of the apparatus of FIG. 3.
Figure 4:
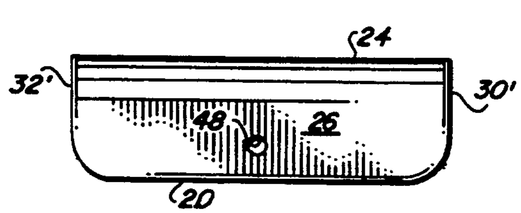
FIG. 4 is an end view of part of the apparatus disclosed in FIG. 5.
Figure 6:
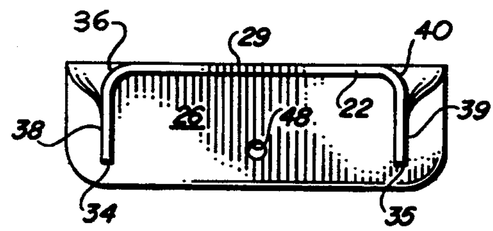
FIG. 6 is an opposite end view of the apparatus of FIG. 4.

As best, seen in FIGS. 2 and 3, the confronting shaped gripping members 18, 18' each have opposed terminal ends 20 and 22, and a top 30 that is opposed to a bottom 32 thereof. As best shown in FIG. 6, edge 34 and 35 of right angle bends 36 and 40 form a marginal length at 38 and 39 that is in the form of opposed, parallel, spaced, load bearing flanges. The opposed bent marginal lengths 38, 39, together with the planar surface 29, form three adjacent walls which cooperate together to form half of the second socket member, and therefore bear against three adjacent walls of an elongate member 14.

A head 42 is formed on through bolts 44. The bolts 44 are provided with a nut and washer 46 which are affixed thereto for tensioning the bolt and thereby greatly increasing the friction between the socket inner surfaces of the gripping members and the outer surface of the elongate members.

when deemed desirable, the bent lateral flange member 26 can be apertured at 48 to optionally receive a flush mounted screw 50 therein in order to facilitate assembly. Likewise, planar surface 29 can be apertured at 48' to optionally receive a flush mounted screw 50 therein, if desired.

Numeral 52 indicates the butt end of elongate horizontal member 14, while numeral 54 indicates the space between the two elongate members 12 and 14 through which the through bolt 44 is extended into engagement with the confronting gripping members. Numeral 55 indicates the width of the space 54. Numeral 56 indicates the spaced apart relationship between terminal ends 20 of opposed confronting gripping members. Numeral 58 indicates the spaced apart relationship between edges 34 of opposed confronting gripping members.

Numerals 60, 62, 64, and 68 indicate adjacent wall surfaces that form a medial length of the elongate vertical member 12. The co-acting inside wall surfaces of a socket formed within a pair of gripping members are brought to bear against wall surfaces 60, 62, 64 and 68 of the elongate vertical member 12. Numerals 61, 63, and 65 indicate adjacent wall surfaces that form the marginal end portion of elongate horizontal member 14. The co-acting inside wall surface of the other socket formed within a pair of gripping members are brought to bear against wall surfaces 61, 63 and 65 of the elongate horizontal member 14 so in this manner the other socket is of a complementary configuration respective to a marginal end of elongate horizontal member 14.

In use, the clamp assembly 16 joins together perpendicularly arranged, square in cross-section, elongate, structural members 12 and 14 to form a framework 10. The clamp assembly 16 comprises a pair of shaped gripping members 18, 18' aligned in confronting relationship respective one another and having opposed planar surfaces 28, 29 that form opposed sockets, with the sockets being arranged normal to one another. One said socket is of a configuration to receive a marginal end of one elongate structural member 14 therewithin. The other said socket is of a configuration to receive a medial length of another elongate structural member 12 therewithin. This secures the perpendicularly arranged structural members together in attached relationship and in a releasable manner.

Each said gripping member 18, 18' is of unitary construction and has a planar surface 28, 29 that is divided into a first socket forming member at 28 and a second socket forming member at 29 by apertures 43 which receive a through bolt 44 extending perpendicularly therethrough. Each said gripping member 18, 18' is of identical construction and has opposed terminal ends 20, 22, a top 30 opposed to a bottom 32, and a bent marginal length 26 of one end extends perpendicular to said planar surface 28 to form adjacent wall surfaces of said first socket forming member and which abuttingly receives adjacent sides 60, 62, 64 and 68 of a medial length of one structural member 12 therewithin.

Opposed marginal lengths 38, 39 of the top and bottom of the second socket forming planar surface 29 extend perpendicular respective to said planar surface 29 to form three adjacent wall surfaces 29, 38, 39 arranged in the form of a U for abuttingly receiving three adjacent wall surfaces 61, 63, 65 of another structural member 14 therewithin. The square in cross-section, elongate structural members 12 and 14 are arranged perpendicular respective to one another and joined together by the clamp assembly 16.

The through bolts 44 extend perpendicularly through the pair of gripping members 18, 18' and between the elongate structural members 12 and 14. The bolt 44 is tensioned to force the pair of gripping members 18, 18' together so that the members bear against and are fastened together by the pair of square in cross-section, elongate, structural members which are arranged perpendicularly respective to one another. The pair of gripping members 18, 18' are spaced apart from one another by the elongate structural members 12 and 14 captured therewithin.

Each gripping member 18, 18' is a deformed sheet of metal having bent marginal lengths 26, 38, 39 thereof arranged perpendicularly to a planar surface 28, 29 thereof and forming part of said sockets which extend about and capture the elongate structural members 12, 14 therewithin and thereby attach one elongate member to the other.

I claim:

1. A clamp assembly for joining perpendicularly arranged, square in cross-section, elongate, structural members to form a framework;

said clamp assembly comprises a pair of shaped gripping members aligned in confronting relationship respective to one another and having opposed sockets arranged to receive spaced structural members arranged normal to one another wherein each gripping member is a deformed sheet of metal;

a second of said sockets is of a configuration to receive a marginal end of one structural member therewithin, a first of said sockets is of a configuration to receive a medial length of another structural member therewithin, and thereby secure perpendicularly arranged structural members together;

each of said gripping members is of unitary construction; each of said gripping members has a planar surface that is divided into a first socket forming member and a second socket forming member by a through bolt extending perpendicularly therethrough;

each of said gripping members has opposed sides and a top opposed to a bottom, a marginal length of one side is bent perpendicular respective to said planar surface to form adjacent wall surfaces of said first socket forming member and abuttingly receives adjacent sides of one structural member therewithin;

opposed marginal lengths of the top and bottom of the second socket forming member is bent to extend perpendicular respective to said planar surface to form three adjacent wall surfaces arranged in the form of a U for abuttingly receiving three adjacent sides of another structural member therewithin;

said through bolt extends perpendicular through both said pair of gripping members and between the elongate structural members, the through bolt is tensioned to force the pair of gripping members to bear against and become fastened to the pair of square in cross-section, elongate, structural members which are arranged perpendicular respective to one another.

2. A clamp assembly for joining perpendicularly arranged, square in cross-section, elongate, structural members and thereby form part of a framework;

said clamp assembly comprises a pair of aligned, confronting, gripping members that include sockets at opposed ends thereof for supporting perpendicularly arranged structural members in fixed relationship respective to each other;

one of said sockets is of complementary configuration respective to a marginal end of one structural member, the other of said sockets is of complementary configuration respective a medial length of the other structural member;

each of said gripping members are of unitary construction, and has a planar surface that is divided into a first planar surface and a second planar surface by through bolts extending perpendicularly therethrough by which said gripping members are forced together and against the outer surface of the structural members;

opposed marginal lengths of a top and bottom of the gripping members extend perpendicular to said second planar surface to form adjacent wall surfaces in the form of a U for abuttingly receiving three adjacent sides of a structural member therewithin;

said of, posed marginal lengths of said top and bottom are parallel to one another and perpendicular to said second planar surface;

through bolts extend perpendicular through both said pair of gripping members and between the elongate structural member and the bolts are tensioned to force the pair of gripping members to bear against and become fastened to the pair of square in cross-section, elongate, structural members which are arranged perpendicular respective to one another;

each gripping member is a deformed sheet of metal having marginal lengths thereof arranged perpendicularly to the planar surface and forming part of said sockets to extend about the elongate members and attach one elongate member to the other;

a terminal end of a first socket forming member is spaced from the confronting gripping member and the opposed marginal lengths of a top and bottom of the second socket forming member are spaced from one another.

3. A pair of shaped gripping members provide a clamp assembly for attachment to perpendicularly arranged, square in cross-section, elongate, structural members to join the members together into a framework;

said pair of shaped gripping members are aligned in confronting relationship respective to one another and having opposed terminal ends that form sockets arranged normal to one another wherein each gripping member is a deformed sheet of metal;

one of said sockets is of a complementary configuration respective to a marginal end of one structural member to receive the member in captured relationship therewithin, the other of said sockets is of a complementary configuration respective to a medial length of another structural member to receive the member in captured relationship therewithin, and thereby removably secure the perpendicularly arranged structural members together;

each gripping member of said pair of shaped gripping mention is of unitary construction, each of said gripping members has a planar surface divided into a first socket forming member and a second socket forming member by a through bolt extending perpendicularly through said planar surface;

the first socket forming member of each said gripping member terminates in a flange which extends perpendicular to said surface to form adjacent wall surfaces of said first socket forming part and abuttingly receives adjacent sides of one structural member therewithin;

the second socket forming member of each said gripping member includes opposed parallel flanges which extend perpendicular to said planar surface to form adjacent wail surfaces in the form of a U for abuttingly receiving three adjacent sides of another structural member therewithin;

said through bolt extends perpendicular through both said gripping members and between the spaced ends of the elongate structural members and means by which the bolt is tensioned to force the gripping members together and to bear against the elongate structural members;

said planar surface is apertured to admit said through bolt therethrough and thereby attach each gripping member to the structural member;

said flange of the first socket forming member is apertured to admit a screw therethrough and thereby further attach said gripping men, bet to the structural members; and a planar surface of the second socket forming member is apertured to admit a screw therethrough and thereby further attach said gripping member to the structural members.

* * * * *